United States Patent [19]
Eto

[11] Patent Number: 5,906,745
[45] Date of Patent: May 25, 1999

[54] APPARATUS AND METHOD FOR PURIFYING POLLUTED WATER

[75] Inventor: Shunji Eto, Koganei, Japan

[73] Assignee: Aquatech, Ltd., Tokyo, Japan

[21] Appl. No.: 08/622,412

[22] Filed: Mar. 27, 1996

[30] Foreign Application Priority Data

Apr. 4, 1995 [JP] Japan .................................. 7-103022

[51] Int. Cl.$^6$ .................................................. C02F 3/30
[52] U.S. Cl. ......................... 210/601; 210/605; 210/615; 210/630; 210/150; 210/199; 210/221.2; 210/620
[58] Field of Search ................................... 210/601, 615, 210/747, 801, 803, 170, 521, 150, 151, 605, 616, 617, 199, 620, 630, 221.2

[56] References Cited

U.S. PATENT DOCUMENTS

| | | | |
|---|---|---|---|
| 1,991,896 | 2/1935 | Hays | 210/617 |
| 4,139,456 | 2/1979 | Yabuuchi et al. | 210/617 |
| 4,141,823 | 2/1979 | Smith et al. | 210/615 |
| 4,169,050 | 9/1979 | Serfling et al. | 210/615 |
| 4,218,318 | 8/1980 | Niimie et al. | 210/150 |
| 4,599,174 | 7/1986 | McDowell | 210/614 |
| 4,786,413 | 11/1988 | Reimann et al. | 210/616 |
| 4,839,053 | 6/1989 | Tharp | 210/616 |
| 4,913,820 | 4/1990 | Kawabata et al. | 210/616 |
| 5,037,551 | 8/1991 | Barkley | 210/617 |
| 5,217,616 | 6/1993 | Sanyal et al. | 210/150 |
| 5,223,129 | 6/1993 | Hsieh | 210/150 |
| 5,227,051 | 7/1993 | Oshima | 210/150 |
| 5,503,738 | 4/1996 | Defilippi | 210/150 |
| 5,565,103 | 10/1996 | Eto | 210/601 |
| 5,605,629 | 2/1997 | Rogalla | 210/615 |
| 5,645,725 | 7/1997 | Zitzelsberger et al. | 210/151 |

FOREIGN PATENT DOCUMENTS

| | | |
|---|---|---|
| 0 627 251 A1 | 12/1994 | European Pat. Off. . |
| 55-011050 | 1/1980 | Japan . |
| 56-065681 | 6/1981 | Japan . |
| 57-171491 | 10/1982 | Japan . |
| 63-310696 | 12/1988 | Japan . |
| 3-221110 | 9/1991 | Japan . |
| 6246281 | 9/1994 | Japan . |
| 6-343990 | 12/1994 | Japan . |

*Primary Examiner*—Robert J. Popovics
*Attorney, Agent, or Firm*—Armstrong, Westerman, Hattori, McLeland & Naughton

[57] ABSTRACT

In a polluted water purifying method and apparatus, a purification treatment tank is filled with massive purifying members in a purifying region, each massive purifying member including plural opening portions having an equivalent diameter of 1 to 5 cm which are provided on the surface thereof, and plural interconnecting channels which intercommunicate with one another and provided inside of the members, and each opening portions continuously intercommunicating with at least one of the channels. Polluted water containing SS, BOD, etc. is supplied through the purifying region of the tank to be brought into contact with the massive purifying members. At the same time, oxygen-contained gas is jetted as fine bubbles at a predetermined interval from the bottom portion of the purifying region into the polluted water so that the stream of the flowing polluted water flowing in the purifying region, so that the fine bubbles of the oxygen-contained gas are contacted with the polluted water in a substantially perpendicular direction to each other, whereby an aerobic treatment and an anaerobic treatment are rapidly and efficiently performed on the surface of the purifying members and inside of the purifying members respectively.

13 Claims, 3 Drawing Sheets

APPARATUS AND METHOD FOR PURIFYING POLLUTED WATER

BACKGROUND OF THE INVENTION

1. Field of the Invention

The present invention relates to apparatus and method for purifying polluted water, and more particularly to apparatus and method for performing an aerobic treatment on polluted water and at the same time separating and capturing suspended fine solid materials (pollutants) from the polluted water to perform an anaerobic treatment on the polluted water.

2. Description of Related Art

Various methods have been hitherto proposed and practically used as a method of purifying various kinds of polluted water, such as waste water or river water which is polluted by waste water. The conventional polluted water purifying methods are mainly classified into (1) a physical/chemical treatment method and (2) a biological treatment method. As the physical/chemical treatment method are known a method for separating and removing suspended materials, etc. from polluted water by means of precipitation, filtering or the like, a method for chemically treating pollutants with chemicals to make the pollutants harmless; and a method of separating and removing pollutants from polluted water by means of agglomeration or precipitation. Further, as the biological treatment method are known a method of aerobically treating polluted water with a biomembrane or an active sludge to flocculate pollutants and separate and remove the pollutants from polluted water; and a method of anaerobically treating polluted water to digest (liquefy) the pollutants.

The biological treatment method utilizes a decomposition action of microorganism in natural field, so that its reaction is moderate. In addition, its process needs no chemical, and thus it does not bring various troubles due to the chemicals. Therefore, the biological treatment method has been favorably used, and various developments for this method are vigorously being made.

With respect to the method using the active sludge, various systems which are concentrically based on two processes of an aeration process and a sedimentation process have been proposed and practically used. With respect to the method of forming a biological film on a carrier, various kinds of carriers are proposed. For example, Japanese Laid-open Patent Application No. Sho-63-310696 proposes a hollow spherical carrier which forms an aerobic state and an anaerobic state at the same time. Further, there is also proposed an aerobic/anaerobic treatment which forms aerobic and anaerobic states by means of a hollow cylinder having a honeycomb construction of a high surface area.

However, in all the conventional biological treatments as described above, a long process time of at least 5 to 11 hours is generally required over all the steps of a purifying treatment. For example, in the method using the active sludge and the aerobic treatment method using the biomembrane formed on the surface of the carrier, a sedimenting pool is provided at a front stage to perform a predetermined sedimenting treatment on polluted water, and then the polluted water is finally treated while held up in an aerobic purification area for a retention time of several hours or more, whereby a predetermined environmental quality standard value is satisfied. In the active sludge method, there is a manner of performing the aeration treatment for about two hours; however, it has a disadvantage that a BOD removal rate may be reduced. Further, in the aerobic/anaerobic purifying treatment method using the hollow carrier, the diameter of holes through which the inside and the outside of the hollow carrier are communicated to each other is set to 0.05 to 1 mm, and thus the flow-in and flow-out of the polluted water into and from the inside of the hollow carrier is not smoothly performed, so that it needs a longer time than the anaerobic treatment in the inner space of the hollow carrier and this is not efficient.

Recently, a so-called inter-conglomerate contact oxidation method which purifies polluted river water by using river beds has been proposed and practically used as one of the biological treatments for polluted water. In the inter-conglomerate contact oxidation method, a conglomerate layer is formed by effectively using conglomerate, such as gravel in the river, or the like, and river water is made to flow (passed) through the conglomerate layer for a biological treatment, whereby BOD (Biochemical Oxygen Demand) and SS (Suspended Solid) can be greatly reduced. Therefore, much attention is paid to this method as a purification method for polluted water, such as polluted river water, or the like.

The inventor of this application has vigorously studied a treatment method in which the purification technique using the inter-conglomerate contact oxidation method can be practically used for a general water treatment device (not to a large-scale facility using a huge river bed, for example) and polluted water can be efficiently purified. As a result of the vigorous studies, the inventor developed a separation member forming a purification treatment system which is completely different from the conventional treatment for polluted water, and previously proposed the separation member and a polluted water treatment using the separation member in Japanese Laid-open Patent Application No. Hei-3-221110. Further, in Japanese Laid-open Patent Application No. Hei-6-343990, which corresponds to U.S. Pat. No. 5,565,103, the inventor proposed a suitable flow-separating method and a flow-separating member in consideration of such a flow-separating phenomenon that suspended fine solid materials are separated and removed from polluted water as flowing fluid with effectively using fluid energy on the basis of the behavior of the suspended fine solid materials.

In the flow-separating member and the flow-separating method as described above, the polluted water is subjected to an aerobic treatment on the surface. The suspended solids (SS) can be efficiently captured by the flow-separating member for a relatively short time to separate and remove the SS from the polluted water, and captured organic SS can be anaerobically treated in voids of the flow-separating member to make the organic SS liquid and soluble. Therefore, this method can simply perform the purification treatment for polluted water in one step for a short time, and thus it is expected to be an extremely excellent treatment method for polluted water.

This method has been achieved mainly to remove SS, and it has been also proved for this method that the aerobic treatment on the surface of the flow-separating member is enhanced and thus the BOD removal rate is effectively enhanced because the surface area of the flow-separating member is increased more than the inter-conglomerate contact oxidation method. However, it would not effectively work from the viewpoint that it must be applicable to any polluted water and it must meet any requirement. Particularly, if it is required to perform a purification treatment on polluted water containing a large amount of BOD at a desired BOD removal rate for a short time, this method does not sufficiently satisfy this requirement.

SUMMARY OF THE INVENTION

Therefore, the inventor has reviewed and considered the polluted water purifying treatments of the above proposed methods and the various conventional methods, and has made studies to achieve a purification treatment method which can perform a purification treatment in a short time and reduce BOD and SS at a high removal rate from any polluted water. As a result, the inventor has recognized that BOD and SS can be effectively removed from any polluted water in a short retention time by using a specific purifying member and performing gas diffusion at a predetermined interval in a purifying region, and achieved the present invention on the basis of the above recognition.

According to the present invention, a polluted water purifying method comprises the steps of: filling into a purifying region in which polluted water under flow is purified, massive purifying members, each of which includes plural opening portions each having an equivalent diameter of 1 to 5 cm on the surface thereof and plural interconnecting channels intercommunicating with one another in the inner portion thereof, each of the opening portions continuously intercommunicating with at least one of the channels, passing polluted water through the purifying region to bring the polluted water in contact with the massive purifying members, and at the same time allowing oxygen-contained gas to ascend upwardly as fine bubbles at predetermined intervals from the bottom portion of the purifying region in the flowing polluted water so that the stream of the flowing polluted water is brought into contact with the fine bubbles of the oxygen-contained gas in a substantially perpendicular direction with respect to each other.

The "massive purifying members" contemplated for use in the practice of the present invention are as shown and described in the above-indicated U.S. Pat. No. 5,565,103.

In the polluted water purifying method as described above, he purifying region is formed between a polluted water flow-in portion and a polluted water flow-out (discharge) portion, and it is preferable that the polluted water flows into the flow-in portion and/or flows out from the flow-out (discharge) portion while rectified. A retention time of the polluted water in the purifying region is preferably set to 10 to 120 minutes. Further, the predetermined interval at which the oxygen-contained gas ascends as the fine bubbles is preferably set to a range of 5 to 100 cm, and it may be varied within this range in accordance with the pollution degree of the polluted water to be treated.

According to the present invention, the purified water which has been treated by the polluted water purifying method as described above, is further passed through a non-diffusion purifying region, in which the massive purifying members, as described above, are filled, thereby performing a purifying treatment. In this case, the non-diffusion purifying region is preferably disposed at a subsequent stage of the flow-out portion of the former purifying region.

Further, according to the present invention, a polluted water purifying apparatus, which is provided with a peripheral wall and a lid, or no lid, to have a predetermined volume, includes a flow-in portion of polluted water, a flow-out (discharge) portion for treated water, a rectifying member which is disposed at each flow-in portion and flow-out portion, a purifying region which is disposed between the flow-in portion and the flow-out portion, gas diffusion pipes which are disposed at predetermined intervals on the bottom portion of the purifying region substantially perpendicularly to a direction extending from the flow-in portion to the flow-out portion, and massive purifying members which are filled in the purifying region and each of which includes plural opening portions each having equivalent diameters of 1 to 5 cm on the surface thereof and plural interconnecting channels intercommunicating with one another in the inner portion thereof, each of the opening portions continuously intercommunicating with at least one of the intercommunication channels.

In the polluted water purifying apparatus as described above, aggregates of relatively small diameter are preferably bonded to one another to form each massive purifying member having a substantially spherical shape and having equivalent diameter of about 7 to 15 cm, and the predetermined interval is preferably set to 5 from 100 cm.

According to the present invention, a purifying method for the polluted water purifying apparatus as described above comprises the steps of: supplying the polluted water from the flow-in portion and passing the polluted water through the purifying region, and diffusing the oxygen-contained gas from the gas diffusion pipes at a front stage portion of the flow-in portion side of the purifying region while diffusing no oxygen-contained gas from the gas diffusion pipes at a rear stage portion of the flow-out portion side to thereby perform the purifying treatment. In this case, the purifying region is preferably sectioned into two parts in a ratio of 1:1 to 5:1 by the front and subsequent stage portions.

Further, according to the present invention, a polluted water purifying apparatus includes first and second purifying apparatuses each having the same construction as the polluted water purifying apparatuses, wherein the flow-out portion of the first purifying apparatus intercommunicates with the flow-in portion of the second purifying apparatus.

Still further, according to the present invention, a polluted water purifying method for the polluted water purifying apparatus including the first and second purifying apparatuses, comprises the steps of: supplying the polluted water from the flow-in portion into the purifying region to pass the polluted water through the purifying region while diffusing oxygen-contained gas from gas diffusion pipes of the first purifying apparatus to conduct a purification treatment on the polluted water, and supplying the purified water from the flow-out portion of the first purifying apparatus to the second purifying apparatus to conduct a further purification treatment on the purified water supplied from the first purifying apparatus in the second purifying apparatus while diffusing no oxygen-contained gas from the gas diffusion pipes of the second purifying apparatus.

According to the present invention, the equivalent diameter of an opening portion is defined as the length of the longest of the lines which connect any two points on the periphery of the opening, and the equivalent diameter of the massive purifying member is defined as the diameter of a spherical body having the same volume as the body of the massive purifying member.

According to the polluted water purifying method of the present invention, the predetermined massive purifying members are filled in the purifying region in which the purification treatment is performed while the polluted water is made to flow, and during the flow of the polluted water, each massive purifying member functions as (1) a forming body for a biomembrane for the aerobic treatment on the surface, (2) a resistor for producing a difference in flow velocity (gradient in velocity) to move SS toward the opening portions on the surface and to flow-separate and capture the SS from the polluted water at the opening portions, and (3) an anaerobic treatment area where the SS captured by the opening portions are held up or trapped therein to be anaerobically treated. Therefore, the massive purifying member effectively acts on organic and inorganic fine solid materials suspended in the polluted water, solved pollutants in the polluted water, etc. to purify the polluted water. That is, according to the present invention, the massive purifying member is formed with a biomembrane on the surface thereof, and the fine bubbles of oxygen-contained gas, such as air, or the like, (hereinafter referred to as "oxygen gas"), is diffused from the bottom portion at predetermined intervals into the polluted water while the oxygen gas ascends in a substantially perpendicular direction to the stream of the polluted water. Therefore, the polluted water flowing in the purifying region and the oxygen gas are sufficiently contacted and mixed with each other and, at the same time, a turbulent flow area is formed in the polluted water stream. Accordingly, formation of boundary layers, such as laminar films, is suppressed around the massive purifying members filled in a gas diffusion area where the oxygen gas is diffused from the bottom portion in the purifying region, and thus the oxygen gas is sufficiently supplied continuously. Therefore, the aerobic process progresses rapidly and efficiently, and the soluble pollutants BOD which are solved in the polluted water, can be easily aerobically treated and removed from the polluted water.

The massive purifying member serves as a resistor in the polluted water flowing area if it is viewed in a micro-scale. Therefore, it reduces the flow velocity of the polluted water in the vicinity thereof to produce a flow-velocity difference (velocity gradient) in the polluted water stream around the purifying members, and at the same time it produces a laminar (viscous) flow area. As described above, the turbulent flow area tends to be formed in the gas diffusion area where the oxygen gas is diffused, whereas the laminar flow area tends to be formed in an oxygen gas non-diffusion area where no oxygen gas is diffused. Therefore, in the oxygen gas non-diffusion area of the purifying region, the fine solid materials (SS) suspended in the polluted water are provided with rotational energy due to the flow-velocity difference (velocity gradient), and move to the laminar flow area around the massive purifying member, in which the flow velocity is low. Further, in the oxygen-gas diffusion area, the SS is partially adsorbed by the biomembrane on the surface of each massive purifying member and then aerobically treated. However, most of the SS is sprung out toward the oxygen gas non-diffusion area adjacent to the oxygen-gas diffusion area, which is caused by random flow of the polluted water in the turbulent flow area, and finally it reaches the laminar flow area around the massive purifying member in the gas non-diffusion area through a flow-separation process.

The SS which reaches the laminar flow area around the massive purifying member is captured at the opening portions on the surface thereof, and finally collected in the interconnecting channels (passages) which intercommunicate with the opening portions. There is little flow in the interconnecting channels of the massive purifying members, and thus these channels can be regarded as retention areas. Therefore, the SS is held up in the retention areas while anaerobically treated, and finally made liquid and soluble. Thereafter, the liquid and soluble SS flows downwardly through the interconnecting channels due to its dead weight, and reaches other openings which are located at the lower side of the massive purifying member and intercommunicate with the channels. Thereafter, the SS flows out from the opening portions into the flowing polluted water and is solved therein, and finally it is aerobically treated on the surface of the purifying members in the gas diffusion area to be purified and removed from the polluted water.

Further, according to the purification treatment of the polluted water in the present invention, different treatment areas which are respectively suitable for the soluble BOD and the suspended SS in the polluted water are provided in the same purifying region to purify the respective materials, so that the purification process can be efficiently performed. That is, for the soluble BOD, the aerobic treatment is rapidly performed on the surface of the massive purifying member while supplying the oxygen gas. For the SS, the capture of the SS at the opening portions of the massive purifying members is promoted, and after the capture, the SS is allowed to be held up in the interconnecting channels inside the massive purifying members to perform the anaerobic treatment. The anaerobic treatment of SS can be performed irrespective of the retention time for the purification treatment of the polluted water flowing in the purifying region, so that the retention time of the polluted water in the purifying region can be remarkably shortened. Accordingly, the treatment apparatus can be miniaturized because the retention time is short, and the polluted water can be purified more efficiently than the conventional apparatus.

For example, with respect to the retention time of the conventional purification treatment, the inter-conglomerate contact oxidation method needs a long distance of about 20 m as a flow distance of the purifying region and needs about 60 to 80 minutes as the retention time. The active sludge method needs a long time of about 3 to 10 hours on average as the retention time. On the other hand, the polluted water purifying treatment of the present invention needs a retention time of about 10 to 120 minutes at the flow distance of about 5 to 10 m to perform a sufficient purification treatment which satisfies various predetermined flow-out standards. In the conventional polluted water treatment, the SS and the soluble BOD are treated at the same level. On the other hand, according to the present invention, the retention time of the polluted water purifying treatment can be shortened by the following features of the present invention. That is, the purifying member which functions as an aerobic treatment area for BOD, also provides a space to function as an anaerobic treatment area, and the gas diffusion area and the gas non-diffusion area are provided in the purifying region, whereby the aerobic treatment is rapidly and, efficiently performed in the aerobic treatment area, and at the same time, the SS can be easily collected in the anaerobic treatment area and a sufficient retention time for the anaerobic treatment can be ensured.

As described above, according to the polluted water treatment of the present invention, the polluted water is purified by the operating mechanism as described above. No limitation is imposed on the polluted water to be treated, and any substance containing various water pollutants such as BOD, SS, ammonium components, musty odor substance, etc. of any concentration can be treated. For example, the polluted water purification treatment of the present invention can perform a purification treatment on polluted water, such as general polluted water containing water pollutants, such as BOD of 20 to 30 mg/liter, SS of 20 mg/liter or more, ammonium components of 1 mg/liter or more, musty substance, etc., urban waste water of BOD of 30 mg/liter or more (ordinarily, about 50 to 150 mg/liter), remarkably polluted processed marine waste water containing BOD of 200 to 1000 mg/liter, etc. more effectively and for a shorter time than the conventional purification treatment. That is, the present invention is suitably applicable to any polluted water purifying treatment. The term "SS" of the present invention means suspended fine solid materials, and defined as residuals which are left on filter paper passing 1 $\mu$m-diameter particles when they are filtered by the filter paper in JIS (Japanese Industrial Standards). The present invention can effectively purify polluted water containing organic materials of about 60 wt % or more in SS.

DETAILED DESCRIPTION OF THE PREFERRED EMBODIMENTS

Preferred embodiments according to the present invention will be described with reference to the accompanying drawings.

Figure 1:
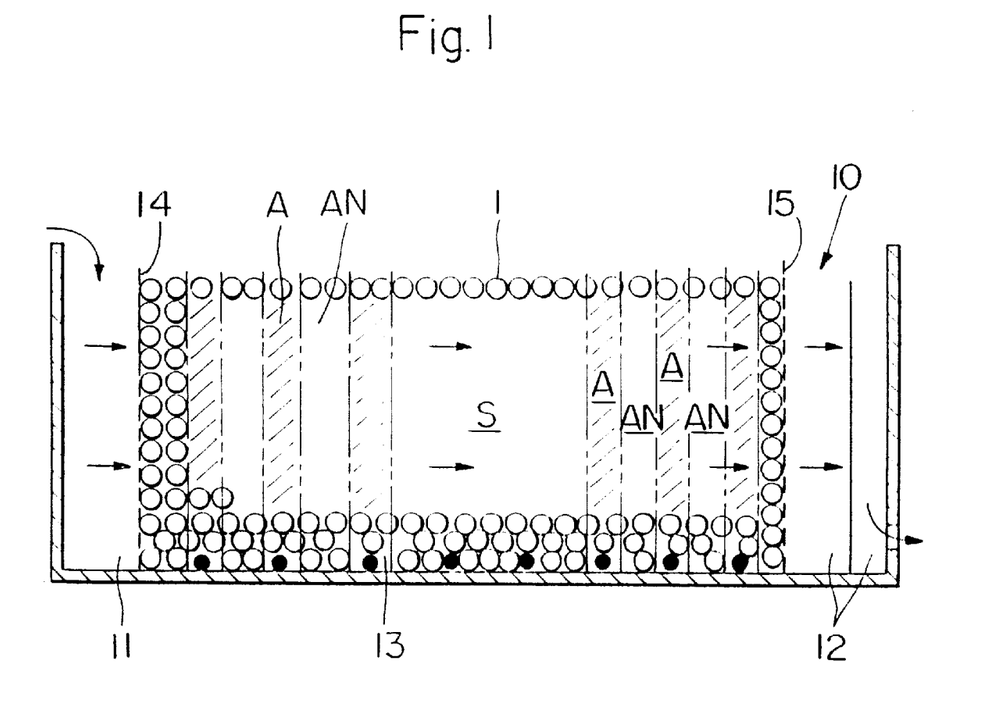
FIG. 1 is a cross-sectional view showing an embodiment of a polluted water purifying tank of the present invention.
Figure 2:
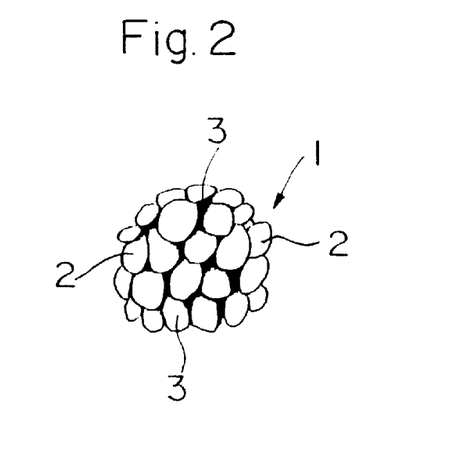
FIG. 2 is a schematic diagram showing a massive purifying member of the present invention.

FIG. 1 is a cross-sectional view showing a purifying apparatus filled with massive purifying members according to an embodiment of the present invention, and FIG. 2 is a schematic diagram showing a typical one of the massive purifying members which fill the apparatus shown in FIG. 1.

In FIG. 1, a polluted water purifying apparatus 10 has a rectangular parallelepiped treatment tank having no lid. A pair of a-flow-in water passage 11 and a flow-out (discharge) water passage 12 are provided at the ends of the treatment tank so as to confront each other, and a spatial purifying region S is provided at the intermediate portion of the tank. The size of the purifying region S is not limited to any specific one, and it may be suitably set in accordance with treatment conditions, such as an amount of polluted water to be introduced, etc., and environmental conditions, such as land on which the purifying apparatus is mounted, etc. For example, if the apparatus is compact, the purifying region S is designed to be about 1 to 2 m in width, 1 to 10 m in length and about 1 to 2 m in depth. If it is a large-size purifying facility for polluted river water, the purifying region S is designed to be about 3 to 10 m in flow length and about 2 to 5 m in depth. In this case, the width of the purifying region S is set to any value in accordance with the amount of polluted water to be treated. If necessary, plural compact apparatuses may be linked to one another in series or in parallel.

Further, any shape and any size may be used for the polluted water treatment tank, and ordinarily the shape is set to a rectangular parallelepiped shape because a treatment tank having such a shape can be easily manufactured. In FIG. 1, the treatment tank is illustrated as having no lid, however, a lid may be disposed at the upper portion. In the case of a large-scale purifying facility, plural treatment tanks may be arranged while linked to one another as described above. Further, after the massive purifying members are filled in the spatial portion to form the purifying region, the upper side thereof may be filled with earth and then buried to use various facilities thereon.

The flow-in water passage 11 serves to guide the polluted water to be treated to the purifying apparatus, and the discharge water passage 12 serves to collect purified water after a purification treatment and discharge the purified water to a river, or the like. At the lower portion, ordinarily at the bottom portion, of the purifying region S disposed between the flow-in water passage 11 and the flow-out water passage 12, plural gas diffusion pipes 13 are disposed at predetermined intervals in the width direction of the treatment tank substantially over the whole width of the treatment tank so as to be substantially perpendicular to the stream direction of the polluted water flowing from the flow-in water passage 11 to the water flow-out passage 12. With this arrangement, substantially the whole purifying region S is alternately sectioned into an oxygen gas diffusion area A (the hatched portions in FIG. 1) and a gas non-diffusion area AN (the unhatched portions in FIG. 1). In the gas diffusion area, fine bubbles of oxygen gas for aeration ascend (are jetted upwardly) from the diffusion pipes 13 across the stream of the polluted water, whereby the polluted water is brought into sufficient contact with the oxygen gas. On the other hand, in the gas non-diffusion area AN, it is preferable that the oxygen gas fine bubbles are not jetted. It is illustrated in FIG. 1 as if a boundary line exists between the gas diffusion area A and the gas non-diffusion area AN. However, this illustration is made to simplify the description, and there is no clear boundary between these areas. That is, this illustration merely means that gas diffusion zones and gas non-diffusion zones are formed. For convenience sake, the sectioning of the gas diffusion area A and the gas non-diffusion area AN is omitted at the intermediate portion of the purifying region S in FIG. 1.

The technical idea that the purification treatment is performed in the purifying region S while sectioning the purifying region into the gas diffusion area A and the gas non-diffusion area AN, as described above, has been achieved by the inventor on the basis of his knowledge that the supply of the oxygen gas to the whole area of the purifying region does not enhance the purification efficiency of the polluted water, and, conversely, it reduces the purification efficiency. That is, it is general that sufficient oxygen supply is necessary to perform the aerobic treatment rapidly and efficiently. Further, it is expected that no polluted water flows through the inside of the massive purifying members and thus SS captured by the massive purifying members can be sufficiently anaerobically treated with no effect of the external. Accordingly, it is a general way to supply the oxygen gas to the whole area of the purifying region S in order to improve the BOD removal rate with the massive purifying members of the present invention, however, the inventor of the present invention is the first engineer who has found out that both the BOD removal rate and the SS removal rate can be multiplicatively enhanced by disposing the gas diffusion pipes 13 at predetermined intervals.

In the case where the purifying region S is sectioned into the gas diffusion areas A and the gas non-diffusion areas AN to enhance the purification efficiency, the interval between the gas diffusion pipes 13 disposed on the bottom portion of the treatment tank is preferably set to about 5 to 100 cm. The disposing interval of the gas diffusion pipes 13 is varied in accordance with the pollution degree of the polluted water to be treated, and it may be suitably set within the above range in accordance with the BOD concentration and the SS concentration in the polluted water.

Ordinarily, if the polluted water contains BOD of about 200 mg/liter or less, the removal rate of BOD and SS could be purified with high efficiency of 85% or more by disposing the gas diffusion pipes at about 50 cm interval. If the disposing interval of the gas diffusion pipes 13 is less than 5 cm, the SS removal rate would be reduced and thus it is not preferable. On the other hand, if the disposing interval is more than 100 cm, the BOD removal rate is insufficient, and the retention time must be set to 2 to 3 hours or more to enhance the removal rate. Accordingly, this case is also unfavorable. The gas diffusion pipes 13 may be beforehand disposed at an interval of about 5 cm on the bottom portion of the treatment tank, and the number and the position of the gas diffusion pipes 13 for supplying the oxygen gas may be suitably selected in accordance with the BOD concentration and the SS concentration in the polluted water to be treated to perform the aerobic treatment in the purifying region S. In this case, the oxygen gas supply to each gas diffusion pipe 13 can be performed by means of a well-known control means, for example, by disposing an open/close valve in the pipes, or the like. Further, no limitation is imposed on the shape, material, etc. of the gas diffusion pipes 13, and various well-known gas diffusion pipes may be used. Further, as the diffusion pipe may be used a pipe having a diameter of about 5 cm and formed of polyvinyl chloride, which is formed with perforated holes at an interval of about 0.5 to 3 cm on the whole peripheral surface or upper half peripheral surface thereof.

In the polluted water purifying apparatus 10 of the present invention, a flow-in water rectifying wall 14 and a discharged water rectifying wall 15 are disposed on the purifying region side surfaces of the flow-in water passage 11 and the flow-out water passage 12 which are disposed around the purifying region S. The rectifying walls 14 and 15 may be designed to have a resistor portion formed by a metal mesh, concrete blocks, or the like. The polluted water flows through the purifying region S as if it is shifted in parallel substantially like a piston flow until it passed through the flow-in water rectifying wall 14 and flows out from the flow-out water rectifying water 15, so that the purification efficiency can be enhanced. Further, the massive purifying members 1 are filled in the purifying region S of the polluted water purifying apparatus 10. The fill rate of the massive purifying members 1 is set to 50 to 70%. That is, the massive purifying members 1 are filled so that the percentage of voids between the massive purifying members 1 in the purifying region S is equal to 30 to 50%. The same massive purifying members 1, as disclosed in Japanese Laid-open Patent Application No. Hei-6-343990 which corresponds to U.S. Pat. No. 5,565,103 are used. That is, as shown in FIG. 2, aggregates 2 having equivalent diameter of several centimeters are assembled, and the contact points of the respective aggregates 2 are bonded to one another with bonding agent such as cement, epoxy adhesive, or the like, to form a substantially spherical massive body having an equivalent diameter of about 7 to 15 cm. In this case, the equivalent diameter of the massive purifying member 1 is defined as the diameter of the spherical body having the same volume as the massive body as described above. The massive purifying member 1, thus formed, is a substantially spherical assembly of aggregates 2, and it has a great number of recesses and projections on the actual surface thereof. Therefore, the surface area is large and the area where the biomembrane is formed is also increased. In addition, turbulent flow tends to occur in the gas diffusion area A, and the contact between the diffused oxygen gas and the polluted water is promoted, so that the aerobic treatment is rapidly and efficiently performed and the shift of the SS to the gas non-diffusion area is promoted.

In the massive purifying members 1 thus formed, the size of the voids formed between the bonded aggregates 2 varies in accordance with the size of the aggregate, and the size, etc. of the aggregates may be suitably selected in order to obtain desired voids. Ordinarily, if aggregates having centimeter-order size are used, voids of about 1 to 3 cm are formed. The surface portions of the voids constitute the surface opening portions 3 of the present invention. The inner voids constitute plural channels (passages) which intercommunicate with one another in the massive purifying members 1. The channels further intercommunicate with the opening portions 3 on the surface portion, and thus penetrate through the inside of the massive purifying members 1. The shape of the opening portions 3 is varied in accordance with the shape, surface, etc. of the used aggregates, and thus it is not limited to any specific one. As described above, the equivalent diameter of the opening portions is defined as the length of the longest of the lines which connect any two points on the peripheral portion of the opening, and it may be set to about 1 to 5 cm by suitably selecting the aggregates, the bonding portions, etc. If the equivalent diameter of the opening portions 3 exceed 5 cm, flow occurs in the channels which intercommunicate with the opening portions 3, and it is impossible to capture and hold SS in the channels. The SS which are captured at the opening portions are held up in the channels intercommunicating with the opening portions and anaerobically decomposed into a liquid substance, and then the liquid substance is passed through the channels to the lower opening portions due to its dead weight, and finally flows out from the massive purifying members. If the diameter of the opening portions 3 is smaller than 1 cm, the decomposed liquid material cannot flow out from the massive purifying member, and this is unfavorable.

The polluted water purifying apparatus 10 of the present invention is constructed as described above, and according to this apparatus, the polluted water is enabled to be purified while uniformly flowing from the flow-in water passage 11 through the purifying region S extending from the flow-in water rectifying wall 14 to the flow-out water rectifying wall 15. As described above, SS in the polluted water flowing in the purifying region S is captured in the massive purifying members 1, collected and restrained to be anaerobically treated, and the other soluble pollutants, such as soluble BOD, ammonium components, anion surfactant, musty materials, etc. are subjected to the aerobic treatment such as nitration, insolubilization, decomposition, or the like, by the biomembrane formed on the outer surface of each purifying member.

The purifying region S of the polluted water purifying apparatus 10 of the present invention is formed with the gas diffusion areas A where the polluted water introduced from the flow-in a portion 11 flows in substantially horizontal direction as indicated by arrows in FIG. 1, and the oxygen gas for aeration, which is jetted from the gas diffusion pipes 13, ascends as fine bubbles in a direction, which is substantially perpendicular to the flow direction of the polluted water, whereby the polluted water and the oxygen gas are efficiently brought into contact with each other in a broad range at all times. In the gas diffusion areas A, the solution efficiency of oxygen into the polluted water is enhanced, and the solved oxygen amount in the polluted water is increased. At the same time, the polluted water stream and the oxygen gas for aeration are simultaneously brought into contact with each other on the surface of the massive purifying members 1 to suppress formation of the boundary layers, such as laminar layers, whereby the biomembrane formed on the surface of each massive purifying member 1 and the polluted water having high solved oxygen amount are sufficiently contacted with each other to promote the aerobic treatment, so that BOD, ammonium components and musty materials, etc. can be removed with high efficiency.

According to the purifying method of the present invention, the capture and collection of SS into the massive purifying members 1 is performed in the gas diffusion area A of the purifying region S, and the formation of the boundary layer on the peripheral surface of the purifying member 1 is mainly suppressed and a sufficient amount of solved oxygen is supplied to the biomembrane formed on the surface of the massive purifying member 1 to perform the aerobic treatment rapidly and efficiently. On the other hand, in the gas non-diffusion area AN, the capture, collection and retention of SS into the massive purifying members 1 are mainly performed efficiently, and the anaerobic treatment of SS is performed for a sufficient retention time independently of the retention time of the polluted water in the purifying apparatus. Accordingly, the purifying region S of the present invention has a great number of aerobic and anaerobic fields, and thus the removal and the anaerobic treatment of SS and the aerobic treatment of soluble BOD, ammonium components, musty materials, etc. can be performed rapidly with high efficiency, so that the purification of the polluted water can be performed at a high flow speed which is several tens to 50 times as high as that of the conventional purification treatment. For example, it takes about 10 minutes as a retention time to purify polluted water which mainly contains BOD, and further it takes about 1.5 hours to purify polluted water which contains a large amount of organic pollutants having BOD of about 300 mg/liter or more. Further, due to the increase of the flow velocity of the polluted water, the contact between the horizontally flowing polluted water and the ascending fine bubbles is promoted, and thus the purification degree can be further increased. The oxygen gas supply amount from the gas diffusion pipes 13 may be suitably selected in accordance with the flow velocity of the pollution degree of the polluted water. It is ordinarily set to about 2 to 15 times of the amount of the polluted water.

Figure 3:
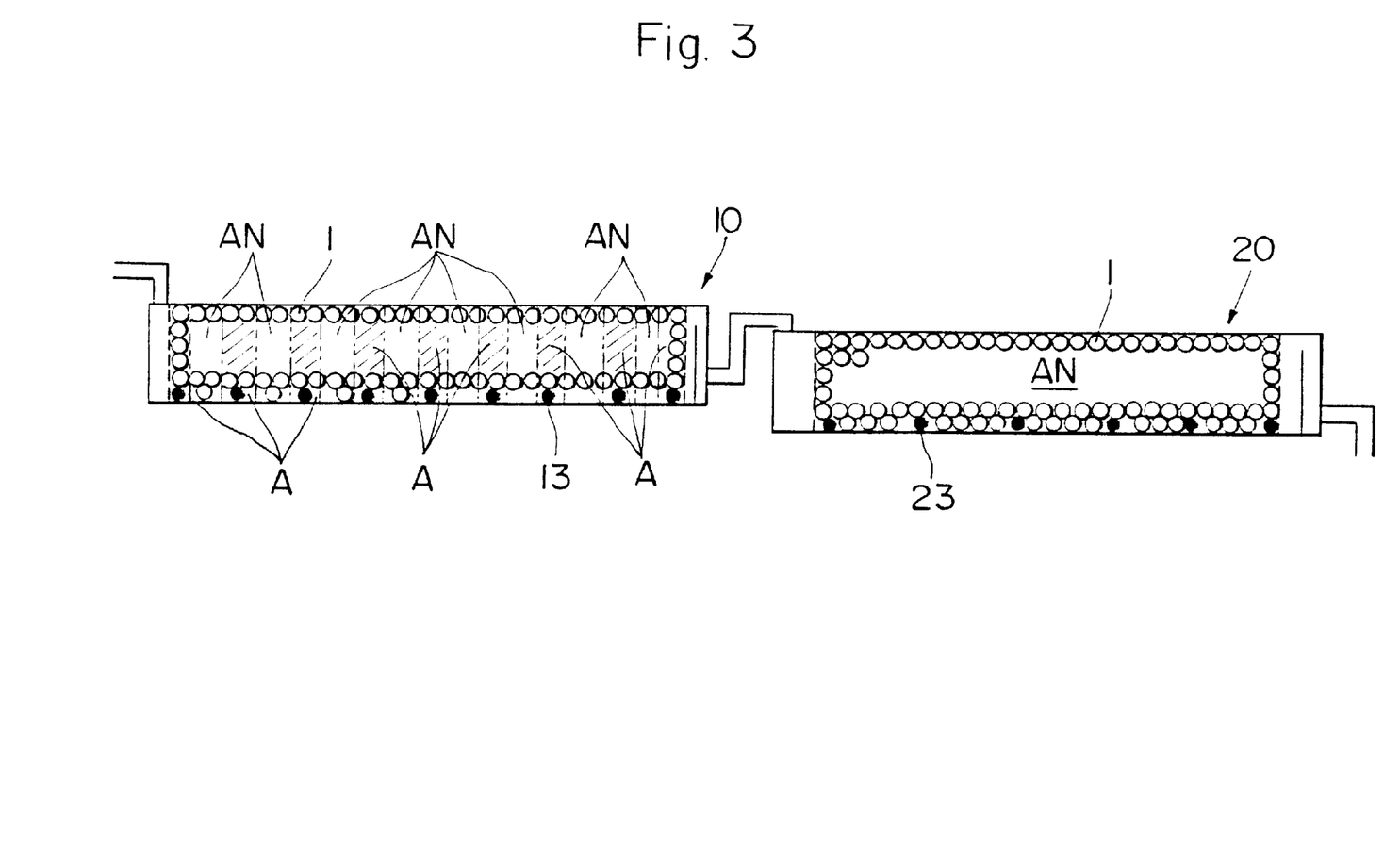
FIG. 3 is a cross-sectional view showing another embodiment of the polluted water purifying tank of the present invention.

FIG. 3 is a cross-sectional view showing another embodiment of the present invention.

In FIG. 3, a purifying tank is filled with the massive purifying members 1, as described above, and the gas diffusion pipes 13 are disposed at predetermined intervals so that the gas diffusion areas A and the gas non-diffusion areas AN are alternately arranged in turn, thereby forming a similar purifying apparatus as described above. Treated water, which has been subjected to the purification treatment in the purifying tank 10, is passed through an interconnecting passage and introduced into a purifying tank 20. In the purifying tank 20, porous pipes 23 which are similar to the gas diffusion pipes 13 of the purifying tank 10 are disposed over the whole width of the purifying tank, however, no gas is diffused from the gas diffusion pipes 23 during the purification treatment, that is, the whole purifying region of the purifying tank is designed as a gas non-diffusion area AN. The disposed gas diffusion pipes 23 are used to perform a sludge discharge treatment of the purifying tank 20, and the disposing interval of the gas diffusion pipes 23 is equal to that of the purifying tank 10. Ordinarily, the disposing interval is set to about 50 to 100 cm.

The purifying method of performing the polluted water purifying treatment by using the in-series linkage of the purifying tank 10 having the gas diffusion areas shown in FIG. 1 to the purifying tank 20 having only the gas non-diffusion area, is suitably applied particularly in such a discharged water quality standard that water discharged after the purification treatment is required to contain SS of 30 ppm or less, and more severely required to contain SS of 10 ppm or less. In the purifying apparatus having the gas diffusion areas shown in FIG. 1, it is generally difficult to set to 10 to 30 ppm or less the concentration of SS in the discharged water after the purification treatment although it varies in accordance with the water quality of polluted water to be treated, particularly the amount of contained SS. That is, if the treated water containing SS of 30 ppm or more, which has been obtained in the purification treatment process of only the purifying tank 10, is further passed through the purifying tank 20 to selectively remove SS in the purifying region under the gas non-diffusion state, the SS concentration can be set to 30 ppm or less, and to 10 ppm or less if necessary.

Figure 4:
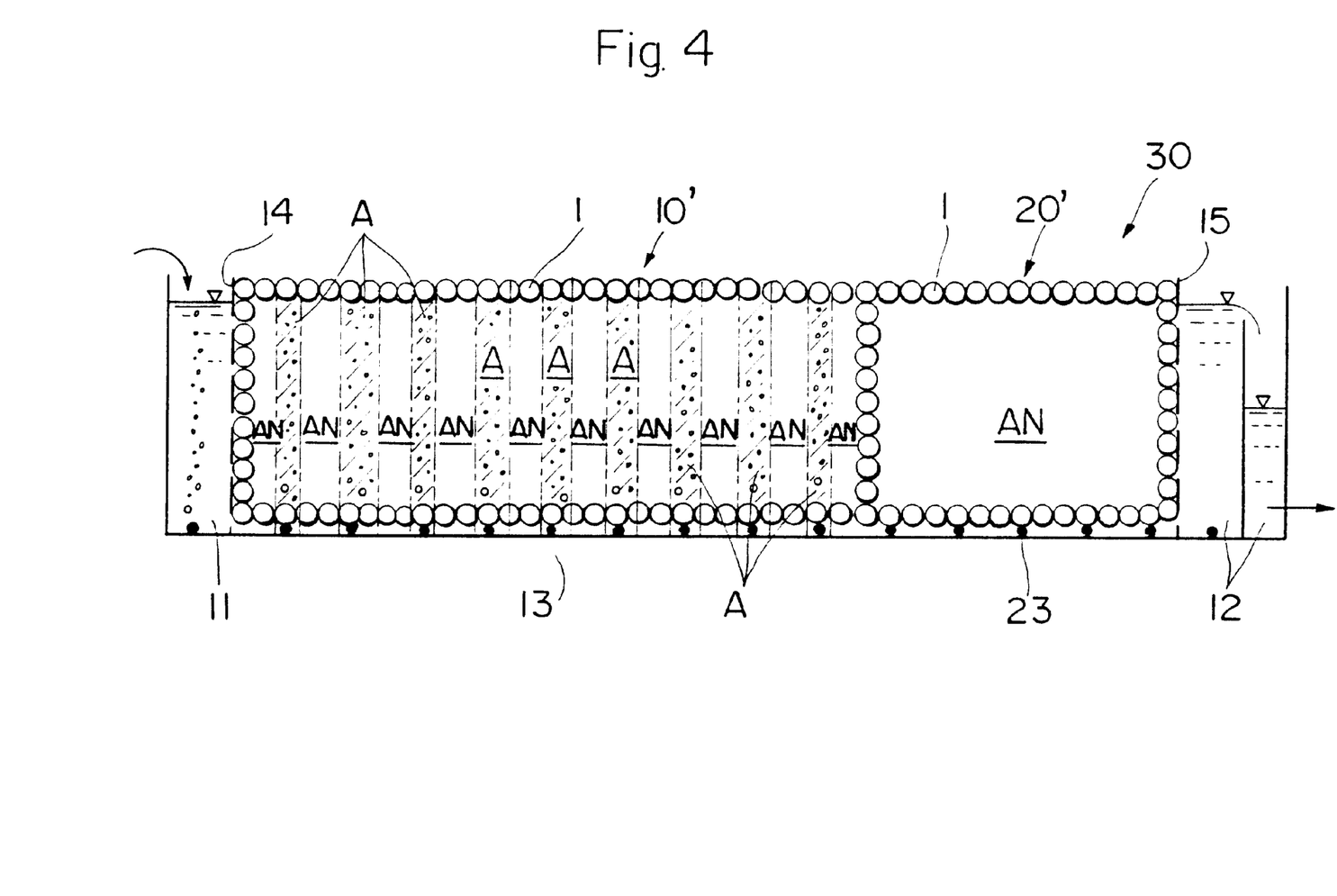
FIG. 4 is a cross-sectional yet another embodiment of the polluted water purifying tank of the present invention.

FIG. 4 is a cross-sectional view showing another embodiment of the present invention.

In FIG. 4, a purifying tank 30 has the same construction as shown in FIG. 1, and includes a flow-in water passage 11, a flow-out water passage 12, a flow-in water rectifying wall 14 and a flow-out water rectifying wall 15. In the purifying tank as described above, a gas diffusion region 10' and a gas non-diffusion region 20' are continuously formed in a space between the flow-in water rectifying wall 14 and the flow-out water rectifying wall 15. Each of the gas diffusion region 10' and the gas non-diffusion region 20' is filled with the massive purifying members 1 as described above, and gas diffusion pipes 13 and 23 are disposed at predetermined intervals in these regions. In the gas diffusion region 10', the gas diffusion areas A and the gas non-diffusion areas AN are alternately formed in the same manner as the purifying region S of the purifying apparatus 10 of FIG. 1. The gas non-diffusion region 20' is formed as a gas non-diffusion area AN in the same manner as the purifying tank 20 of FIG. 3, and no gas is diffused from the gas diffusion pipes 23 during the purifying treatment like the purifying tank 20 of FIG. 3. Further, like the purifying tank 20 of FIG. 3, the gas diffusion pipes 23 are used to perform the sludge discharge treatment on the gas non-diffusion area.

The purifying tanks 10 and 20 shown in FIG. 3 are separately provided and linked to each other through the interconnecting passage. On the other hand, in the purifying tank shown in FIG. 4, the gas diffusion region 10' and the gas non-diffusion region 20' are continuously linked to each other through no interconnecting passage, and this embodiment has the same action as the embodiment shown in FIG. 3 except that the polluted water which is treated in the gas diffusion region 10' directly flows into the gas non-diffusion region 20', and thus this embodiment is suitably applicable to the case where the discharge standards of SS concentration are severe. In this system, the treatment tank is single, and the space portion has the gas diffusion pipes 13 or 23 disposed at the predetermined interval and is filled with the massive purifying members 1. In addition, the supply of the oxygen gas to the gas diffusion pipes may be suitably selectively performed in accordance with the sectioning rate of the regions 10' and 20'. Therefore, the construction of the purifying tank is simple and the cost of construction is low, and thus this embodiment is very practical. In this case, the sectioning rate of the gas diffusion region 10' and the gas non-diffusion region 20' may be suitably selected in accordance with various purification treatment conditions, such as the content of SS in polluted water to be treated, the pollution degree of soluble pollutants such as BOD, etc., the volume of the purifying tank, the flow-in amount of the polluted water, the retention time in the purifying region, etc. Ordinarily, it is preferably set to 1:1 to 5:1. If the rate of the gas diffusion region is less than 1, it is impossible to efficiently remove both the SS and the soluble pollutants such as BOD, etc. for purification of polluted water. On the

EMBODIMENTS

Embodiment 1

First, the same massive purifying members 1 as shown in FIG. 2 were formed as follows. Plural conglomerates each having about 2 to 3 cm diameter were prepared as aggregates 2, and these conglomerates were bonded to one another with adhesives to form substantially spherical massive purifying members 1 each having an equivalent diameter of about 10 cm. On the surface of each massive purifying member 1 were provided many opening portions 3 each having an equivalent diameter of about 1 to 5 cm. Subsequently, eleven gas diffusion pipes 13 were disposed at an interval of about 50 cm on the bottom portion of a rectangular parallelepiped purifying tank of 1.0 m in width, 6.8 m in length and 1.2 m in height, and then the massive purifying members 1 were filled at 40% in percentage of voids into the purifying tank to form the same purifying apparatus 10 as shown in FIG. 1. The length of the purifying region filled with the massive purifying members was set to 5 m, and the substantial volume of the purifying region was 5.50 $m^3$.

Polluted water containing SS of 85.1 mg/liter on average (varying from 42.5 to 151.2 mg/liter), BOD of 127.3 mg/liter on average (varying from 64.2 to 203.7 mg/liter), and colibacillus of 119,200 number/milliliter, was passed through the above purifying apparatus 10 at a flow velocity of 2.2 $m^3$/hour for a retention time of 1 hour (because there is substantially no flow of polluted water in voids of the interconnecting channels inside of the massive purifying members 1) to continuously perform the purification treatment. In the purification treatment, the air for aeration was jetted from the gas diffusion pipes 13 at all times. The amount of the aeration air was set to ten times of the flow amount of the polluted water, that is, to 22 $Nm^3$/hour. After the above continuous purification treatment had been carried out for 5 months, discharged water which had been subsequently subjected to the continuous purification treatment for 24 hours was sampled and subjected to an continuous examination. As a result, the discharged water contained, as average values for 24 hours, SS of 24.5 mg/liter (removal rate of 71.2%), BOD of 28.1 mg/liter (removal rate of 78.0%), colibacillus of 17,000 number/milliliter (removal rate of 86.0%).

Embodiment 2

The same purification treatment as shown in FIG. 3 was performed. That is, the purifying region was formed in the same manner as the purifying tank 10, and the tanks were linked to each other through the pipe, except that the sludge discharging gas diffusion pipes 23 were disposed at an interval of 50 cm on the bottom portion of the purifying tank 20. Polluted water containing SS of 110.4 mg/liter on average (varying from 39.2 to 211.7 mg/liter), BOD of 347.7 mg/liter on average (varying from 137.9 to 1090.4 mg/liter), and colibacillus of 131,700 number/milliliter, was passed continuously through both the above purifying apparatus 10 and the purifying tank 20 at a flow velocity of 2.2 $m^3$/hour for a retention time of 1.5 hour. In the purification treatment, the air for aeration was jetted from the gas diffusion pipes 13 at all times. The amount of the aeration air was set to ten times of the flow amount of the polluted water, that is, to 22 $Nm^3$/hour. As a result of the continuous purification treatment which had been carried out for one year, it was found out that discharged water contained, as average values for one year, SS of 4.8 mg/liter (removal rate of 95.7%), BOD of 15.6 mg/liter (removal rate of 95.5%), colibacillus of 7,031 number/milliliter (removal rate of 94.7%).

After the purification treatment for one year, gas was diffused from the gas diffusion pipes 13 of the purifying tank 10 while the polluted water was passed through the purifying tank 10 at a flow velocity of 2.2 $m^3$, and at the same time air was jetted from the gas diffusion pipes 23 of the purifying tank 20 at a flow velocity of 22.0 $Nm^3$ to perform the sludge discharge treatment. As a result, sludge of 18.0 kg could be obtained. The content of organic materials in the sludge was about 20 to 28%, and it was the same level as sediment of an ordinary river bed.

Embodiment 3

Eight gas diffusion pipes 13 were disposed at an interval of about 50 cm on the bottom portion of a rectangular parallelepiped purifying tank of 1.5 m in width, 5 m in purifying area length and 1.5 m in height, and then the massive purifying members 1 were filled at 40% in percentage of voids into the purifying tank to form the same purifying apparatus 10 as shown in FIG. 1. Two purifying apparatuses 10 as described above were linked to each other in series to form a purifying treatment tank. The volume of the purifying area was equal to 22.5 $m^3$, and the corresponding water water purifying capacity was equal to 9.0 $m^3$.

Polluted water containing SS of 28.8 mg/liter on average (varying from 6.3 to 69.0 mg/liter), BOD of 50.9 mg/liter on average (varying from 7.5 to 93.5 mg/liter), and colibacillus of 168,833 number/milliliter, was passed continuously through the above purifying apparatus 10 at an average flow velocity of 3.9 $m^3$/hour for a retention time of 1 hour to continuously perform the purification treatment. In the purification treatment, the air for aeration was jetted from the gas diffusion pipes 13 at all times. The amount of the aeration air was set to five times of the flow amount of the polluted water, that is, to 20 $Nm^3$/hour. After the above continuous purification treatment had been carried out for 5 months, discharged water which had been subsequently subjected to the continuous purification treatment for 24 hours was sampled and subjected to a continuous examination. As a result, the discharged water contained, as average values for 24 hours, SS of 1.5 mg/liter (removal rate of 92.6%), BOD of 3.3 mg/liter (removal rate of 89.7%), colibacillus of 52 number/milliliter (removal rate of 99.9%).

Embodiment 4

The purification treatment was performed in the same manner as shown in FIG. 4. That is, 320 gas diffusion pipes 13 (23) were disposed at an interval of about 5 cm on the bottom portion of a rectangular parallelepiped purifying tank of 1.5 m in width, 18.5 m in purifying area length and 2 m in height, and then the same massive purifying members 1 as the embodiment of FIG. 1 were filled therein at 40% in percentage of voids into the purifying tank to form the same purifying apparatus 30 as shown in FIG. 4. The volume of the purifying region was equal to 48 $m^3$. In this case, the length of the gas diffusion region 10' was set to 10 m, and the length of the gas non-diffusion region 20' was set to 6 m. Polluted water containing SS of 132.3 mg/liter on average, BOD of 50.9 mg/liter on average and colibacillus of 125,200 number/milliliter, was passed continuously through the above purifying apparatus 30 at a flow velocity of 12 $m^3$/hour for a retention time of 1.5 hour to continuously perform the purification treatment. In the purification treatment, the air for aeration was jetted from the gas diffusion pipes 13 in the gas diffusion region 10' at all times.

The amount of the aeration air was set to ten times of the flow amount of the polluted water, that is, to 120 Nm³/hour. After the above continuous purification treatment had been carried out for 8 months, discharged water which had been subsequently subjected to the continuous purification treatment for 24 hours was sampled and subjected to a continuous examination. As a result, the discharged water contained, as average values for 24 hours, SS of 4.1 mg/liter (removal rate of 96.9%), BOD of 13.9 mg/liter (removal rate of 96.2%), colibacillus of 102 number/milliliter (removal rate of 99.9%).

After the purification treatment for eight months, gas was diffused from the gas diffusion pipes 13 of the purifying region 10' while the polluted water was passed at a flow velocity of 12 m³, and at the same time air was jetted from the gas diffusion pipes 23 in the gas non-diffusion region 20' at a flow velocity of 60 Nm³ to perform the sludge discharge treatment. In these eight months, the sludge discharge treatment was carried our three times, and as a result of these sludge discharge treatments, sludge of 105.2 kg could be obtained. The content of organic materials in the sludge was about 20 to 28%, and it was the same level as sediment of ordinary river bed.

According to the polluted water purifying method of the present invention, the purifying region filled with the prescribed massive purifying members is formed, and the gas diffusion pipes are disposed at predetermined intervals at predetermined positions in the purifying region. Accordingly, many aerobic treatment areas and anaerobic treatment areas are provided at the same time in the same purifying treatment region, and thus the aerobic treatment and the anaerobic treatment can be performed on polluted water at plural times while the polluted water flows in the purifying tank. Therefore, the purification treatment on the polluted water can be rapidly and efficiently performed for a short time. The purifying members have opening portions on the surfaces thereof, and the gas diffusion areas and the gas non-diffusion areas which are alternately formed at the interval corresponding to the disposing interval of the gas diffusion pipes in the purifying region act on each other multiplicatively, whereby SS in the polluted water can be easily captured at the opening portions of the purifying members and removed from the polluted water. Further, the captured SS can be held up in the massive purifying members, and thus it is anaerobically treated for another retention time which is different from the retention time of the polluted water flowing in the purifying region, so that the polluted water can be purified in the extremely short retention time with high efficiency. As compared with the conventional purification treatment, the oxygen solution efficiency can be more enhanced, and the contact efficiency between the polluted water to be treated and the biomembrane can be increased, so that the aerobic treatment can be performed rapidly and efficiently.

What is claimed is:

1. A polluted water purifying method comprising the steps of:
    filling a purifying region of a container with massive purifying members containing a plurality of surface openings, each having an equivalent diameter of from about 1 cm to about 5 cm and a plurality of internal mutually intercommunicating channels, each of said openings communicating with at least one of said channels; and
    passing a stream of polluted water through said purifying region of said container in contact with said massive purifying members while simultaneously passing oxygen-contained gas as fine bubbles in a plurality of streams located at spaced intervals of from about 5 cm to about 100 cm along the stream of polluted water and directing said oxygen-contained gas into contact with overlying massive purfying members substantially perpendicular to said polluted water stream so that the stream of the flowing polluted water is brought into contact intermittently with the streams of fine bubbles of the oxygen-contained gas thereby treating the water by a purification treatment.

2. The polluted water purifying method as claimed in claim 1, wherein said purifying region is formed between a flow-in portion from which the polluted water flows in, and a flow-out portion from which purified water flows out.

3. The polluted water purifying method as claimed in claim 2, further comprising the step of rectifying the polluted water at said flow-in portion and/or said flow-out portion.

4. The polluted water purifying method as claimed in claim 1, wherein the polluted water is retained in said purifying region for a period between 10 to 120 minutes.

5. The polluted water purifying method as claimed in any one of claims 1 to 4, wherein the predetermined interval is set to be variable in the range in accordance with pollution degree of the polluted water to be treated.

6. The polluted water purifying method as claimed in claim 1, further comprising the step of thereafter passing the water treated in the purification treatment into a non-gas-diffusion purifying region filled with said massive purifying members.

7. The polluted water purifying method as claimed in claim 6, wherein said non-gas-diffusion purifying region is disposed in said purifying region of said container downstream of said stream of oxygen-contained gas and upstream of said flow-out portion.

8. A polluted water purifying apparatus, comprising:
    a container having a peripheral wall defining a predetermined volume;
    a flow-in portion for polluted water at one end of said container, and
    a flow-out portion for treated water at another end of said container;
    a rectifying member disposed at each of said flow-in portion and said flow-out portion generally defining paths of flow of polluted water through said container;
    a purifying region in said container disposed between said flow-in portion and said flow-out portion and traversed by said paths of flow of polluted water;
    a plurality of massive purifying members substantially filling the purifying region in said container, each of said massive purifying members containing a plurality of flow conducting passages including a plurality of openings on the surfaces of said members having an equivalent flow conducting diameter of from 1 to 5 cm and a plurality of interconnecting channels intercommunicating with one another inside of said massive purifying members, each of the openings intercommunicating with at least one of the interconnecting channels; and
    gas diffusion pipes disposed at predetermined intervals of from about 5 cm to about 100 cm in said container beneath said polluted water flow paths and being operative to jet a plurality of spaced oxygen-contained gas streams into contact with overlying massive purifying members in said container in a direction substantially perpendicular to said polluted water flow paths.

9. The polluted water purifying apparatus as claimed in claim 8, wherein each of said massive purifying members comprises a plurality of aggregates bonded to one another and formed in a substantially spherical shape having an equivalent diameter of from about 7 to about 15 cm.

10. A polluted water purifying method for utilizing the polluted water purifying apparatus as claimed in claim 8, wherein the polluted water is introduced into said container from said flow-in portion and passed through said purifying region while oxygen-contained gas is diffused from said gas diffusion pipes at a front stage portion of the container adjacent the flow-in portion side of said purifying region and no oxygen-contained gas is diffused from said gas diffusion pipes at a subsequent stage portion of the container adjacent the flow-out portion side of said purifying region to thereby perform the purifying treatment.

11. The polluted water purifying method as claimed in claim 10, wherein said purifying region is sectioned by said front stage portion and said subsequent stage portion in a sectioning ratio of 1:1 to 5:1.

12. A polluted water purifying apparatus including first and second purifying apparatuses, each of which apparatuses includes a container having a flow-in portion for polluted water, a flow-out portion for treated water, a purifying region disposed in said container between said flow-in portion and said flow-out portion whereby rectifying members generally define paths of flow of polluted water between said flow-in portion and said flow-out portion, gas diffusion pipes disposed at predetermined intervals of from about 5 cm to about 100 cm along said purifying region beneath said polluted water flow paths and being operative to disperse gas in a direction substantially perpendicular to said polluted water flow paths, and massive purifying members substantially filling the purifying region of said container, each of which massive purifying members contains a plurality of flow conducting passages including a plurality of openings on the surfaces of said members having an equivalent flow conducting diameter of from about 1 to about 5 cm and a plurality of interconnecting channels intercommunicating with one another inside of said massive purifying members, each of said openings intercommunicating with at least one of the interconnecting channels, said massive purfying members overlying said gas diffusion pipes being operative to be contacted by gas from said gas diffusion pipes in a direction substantially perpendicular to the direction of contact of said massive purifying members by said polluted water, and wherein said flow-out portion of said first purifying apparatus and said flow-in portion of said second purifying apparatus intercommunicate with each other.

13. A polluted water purifying method for utilizing the polluted water purifying apparatus as claimed in claim 12, wherein the polluted water is supplied from said flow-in portion into said purifying region of said container of said first apparatus to pass the polluted water through said purifying region thereof while the oxygen-contained gas is diffused from said gas diffusion pipes of said first purifying apparatus to perform a purification treatment on the polluted water, and the purified water is supplied from said flow-out portion of said first purifying apparatus to said flow-in portion of said second apparatus to perform a further purification treatment on the purified water supplied from said first purifying apparatus in said second purifying apparatus while no oxygen-contained gas is diffused from said gas diffusion pipes of said second purifying apparatus.

\* \* \* \* \*